United States Patent
Rutelin et al.

(10) Patent No.: US 12,330,578 B1
(45) Date of Patent: Jun. 17, 2025

(54) PANEL ASSEMBLY FOR A VEHICLE

(71) Applicant: Volvo Car Corporation, Gothenburg (SE)

(72) Inventors: Sebastian Rutelin, Fagerfjäll (SE); Johan Rosenberg, Lerum (SE); William Hübinette, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/544,714

(22) Filed: Dec. 19, 2023

(51) Int. Cl.
*B60R 21/205* (2011.01)
*B60R 21/215* (2011.01)

(52) U.S. Cl.
CPC .......... *B60R 21/215* (2013.01); *B60R 21/205* (2013.01); *B60R 2021/21512* (2013.01)

(58) Field of Classification Search
CPC ... B60R 21/205; B60R 21/206; B60R 21/215; B60R 2021/21512; B60R 2021/21525
See application file for complete search history.

(56) References Cited

U.S. PATENT DOCUMENTS

| | | | | |
|---|---|---|---|---|
| 9,174,600 B1 * | 11/2015 | Jayasuriya | ............ | B60R 21/206 |
| 2002/0121770 A1 * | 9/2002 | Schneider | ............ | B60R 21/215 |
| | | | | 280/732 |
| 2004/0007856 A1 * | 1/2004 | Enders | ............ | B60R 21/235 |
| | | | | 280/730.1 |
| 2004/0100080 A1 * | 5/2004 | DePue | ............ | B60R 21/231 |
| | | | | 280/743.1 |
| 2016/0031400 A1 * | 2/2016 | Ruthinowski | ......... | B60R 21/215 |
| | | | | 280/743.1 |

FOREIGN PATENT DOCUMENTS

| | | | | |
|---|---|---|---|---|
| DE | 10001658 A1 * | 9/2000 | ........... | B60R 21/206 |
| DE | 10122904 C1 * | 11/2002 | ........... | B60R 21/206 |
| DE | 102015112342 A1 * | 2/2016 | ........... | B60R 21/206 |
| EP | 684164 A1 * | 11/1995 | ............. | B60R 21/02 |
| EP | 1479571 A1 * | 11/2004 | ......... | B60R 21/2165 |
| FR | 2781442 A1 * | 1/2000 | ........... | B60R 21/045 |

OTHER PUBLICATIONS

Description Translation for EP 1479571 from Espacenet (Year: 2004).*

* cited by examiner

*Primary Examiner* — Jason D Shanske
*Assistant Examiner* — Daniel M. Keck
(74) *Attorney, Agent, or Firm* — Clements Bernard Walker; Christopher L. Bernard

(57) ABSTRACT

A panel assembly for a vehicle. The panel assembly includes an occupant-facing surface, and a detachable portion of the occupant-facing surface. The detachable portion is adapted to contact an occupant when the detachable portion is detached from the occupant-facing surface during deployment of an airbag from behind the occupant-facing surface.

20 Claims, 5 Drawing Sheets

PANEL ASSEMBLY FOR A VEHICLE

INTRODUCTION

The present disclosure relates generally to the automotive field. Interior designs of current and future vehicles are focused on creating more and more roominess. More roominess increases the freedom of movement for an occupant when in autonomous driving scenarios, for example. To be able to offer sufficient restraining performance in the event of a collision, however, airbag cushions need to increase in both inflated and packaged/folded volume in roomier interiors. A means for reducing the volume of an airbag is needed for such current and future airbag modules.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a panel assembly, such as an instrument panel assembly, for a vehicle. As described in more detail herein, a detachable portion of the panel restrains an occupant in the vehicle during a collision of the vehicle. In various embodiments, the panel assembly includes an occupant-facing surface that includes the detachable portion. When a system of the vehicle detects a collision, the system causes the detachable portion to contact the occupant when the detachable portion is detached during deployment of an airbag from behind the occupant-facing surface. The detachable portion is thus adapted to contact the occupant during deployment of the airbag.

In one illustrative embodiment, the present disclosure provides a panel assembly for a vehicle. The panel assembly includes: an occupant-facing surface; and a detachable portion of the occupant-facing surface. The detachable portion is adapted to contact an occupant when the detachable portion is detached from the occupant-facing surface during deployment of an airbag from behind the occupant-facing surface. Optionally, in some embodiments, the detachable portion is adapted to contact knees or lower leg portions of the occupant. In some embodiments, the detachable portion is coupled to the airbag. In some embodiments, the airbag guides the detachable portion toward knees or lower leg portions of the occupant. In some embodiments, the detachable portion maintains contact with knees or lower leg portions of the occupant during a collision in order to decelerate movement of the occupant. In some embodiments, the detachable portion when in a deployed state prevents the occupant from traveling underneath the panel assembly during a collision. In some embodiments, a surface area of the detachable portion is greater than a surface area of a portion of the airbag that applies pressure against knees or lower leg portions of the occupant during a collision.

In another illustrative embodiment, the present disclosure provides a panel assembly for a vehicle. The panel assembly includes: an occupant-facing surface; a detachable portion of the occupant-facing surface; and at least one airbag. The detachable portion is adapted to contact an occupant when the detachable portion is detached from the occupant-facing surface during deployment of the at least one airbag from behind the occupant-facing surface. Optionally, in some embodiments, the detachable portion is adapted to contact knees or lower leg portions of the occupant. In some embodiments, the detachable portion is coupled to the airbag. In some embodiments, the airbag guides the detachable portion toward knees or lower leg portions of the occupant. In some embodiments, the detachable portion maintains contact with knees or lower leg portions of the occupant during a collision in order to decelerate movement of the occupant. In some embodiments, the detachable portion when in a deployed state prevents the occupant from traveling underneath the panel assembly during a collision.

In a further illustrative embodiment, the present disclosure provides a computer-implemented method for restraining an occupant in a vehicle, the method includes: detecting a collision of the vehicle; and causing a detachable portion of an occupant-facing surface of a panel assembly to contact the occupant when the detachable portion is detached from the occupant-facing surface during deployment of an airbag from behind the occupant-facing surface. Optionally, in some embodiments, the detachable portion is adapted to contact knees or lower leg portions of the occupant. In some embodiments, the detachable portion is coupled to the airbag. In some embodiments, the airbag guides the detachable portion toward knees or lower leg portions of the occupant. In some embodiments, the detachable portion maintains contact with knees or lower leg portions of the occupant during a collision in order to decelerate movement of the occupant. In some embodiments, the detachable portion when in a deployed state prevents the occupant from traveling underneath the panel assembly during a collision. In some embodiments, a surface area of the detachable portion is greater than a surface area of a portion of the airbag that applies pressure against knees or lower leg portions of the occupant during a collision.

It will be readily apparent to those of ordinary skill in the art that aspects and features of the various described embodiments of the present disclosure may be utilized, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components and/or method steps, as appropriate.

Again, it will be readily apparent to those of ordinary skill in the art that aspects and features of the various illustrated embodiments of the present disclosure may be utilized, omitted, and/or combined as desired in a given application, without limitation.

DETAILED DESCRIPTION

Figure 1:
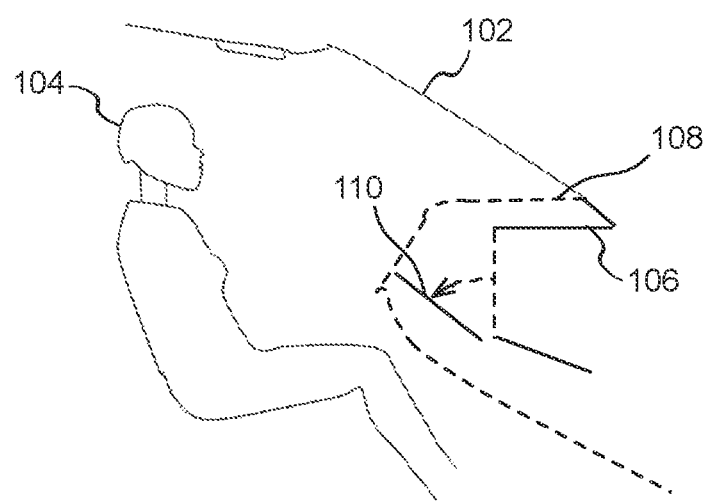
FIG. 1 is a schematic diagram of an example environment for a panel assembly for a vehicle.

FIG. 1 is a schematic diagram of an example environment 100 for a panel assembly, such as an instrument panel assembly, for a vehicle. In various embodiments, the environment 100 includes a vehicle 102 with an occupant 104.

The vehicle 102 includes an instrument panel assembly 106, for example, having an occupant-facing surface. The instrument panel assembly 106 contains one or more airbags (one example airbag shown deployed in FIG. 3).

In various embodiments, the instrument panel assembly 106 has a small or slim form factor that has an overall size that is smaller than a conventional instrument panel. A conventional instrument panel 108 is not present in environment 100, and is instead shown in dashed lines for comparison. In other words, the conventional instrument panel 108 is replaced by the instrument panel assembly 106. With regard to the slim form factor of the instrument panel assembly 106, in various embodiments, there may be instances where instrument panel assembly 106 is reduced in size by more than 50% of a conventional instrument panel size, for example. The reduction in size may vary, depending on the particular implementation.

As shown, the occupant-facing surface of the instrument panel assembly includes a detachable portion 110. As described in more detail herein, the detachable portion 110 enables the slimmer form factor. This is because in part that the detachable portion 110 functions as an integral component of the restraining and deceleration of the occupant 104 during a collision. The detachable portion 110 combined with a deployed airbag provides the restraining and deceleration of the occupant 104.

Figure 3:
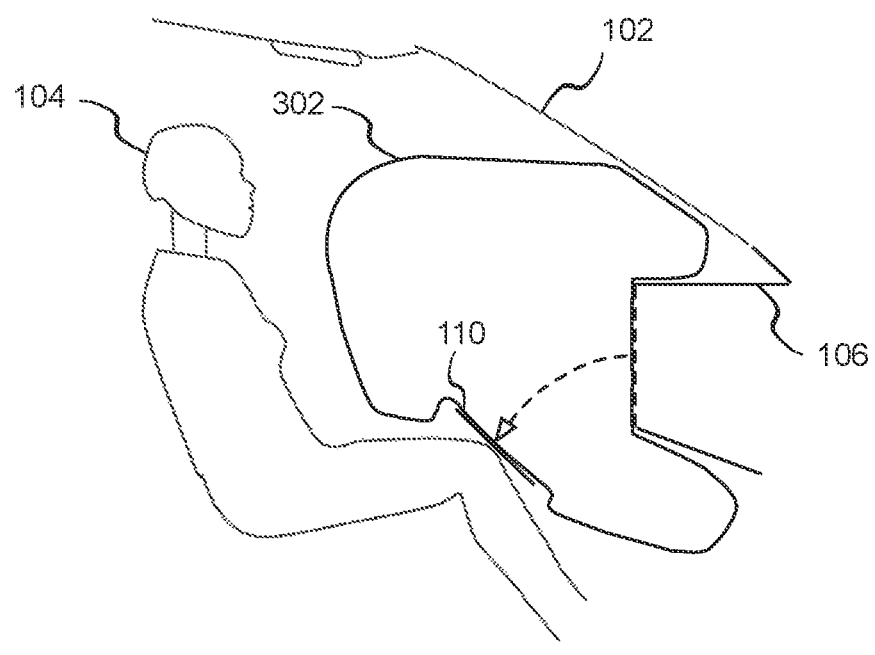
FIG. 3 is a schematic diagram of an example environment for a panel assembly for a vehicle, where an airbag is deployed.

During deployment of the airbag and the detachable portion 110, the detachable portion 110 completely detaches from the instrument panel assembly 106. The detachable portion 110 is not hinged or otherwise attached to the instrument panel assembly 106 after deployment. As described in more detail herein, the detachable portion 110 is released and completely separated from the rest of the instrument panel assembly 106 in order to make contact and to restrain the occupant with the guidance of an airbag (FIG. 3). In various embodiments, environment 100 may not have all of the components shown and/or may have other elements including other types of elements instead of, or in addition to, those shown herein.

Figure 2:
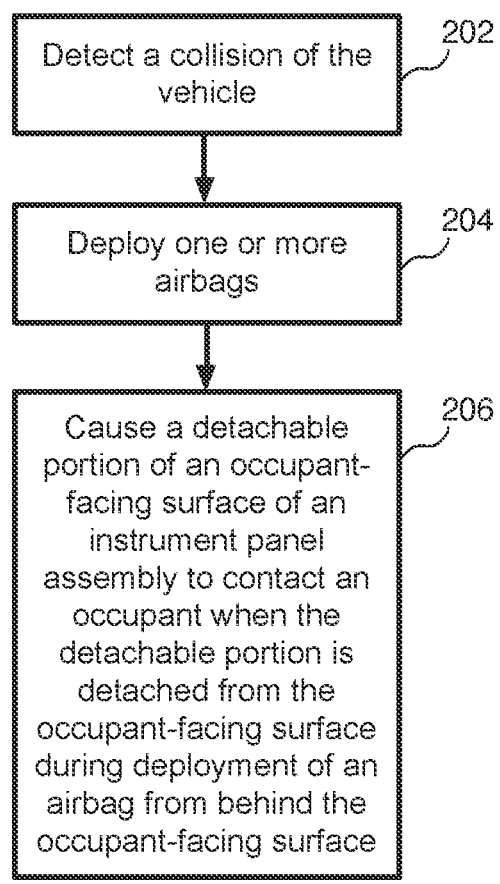
FIG. 2 is a flow chart for providing a panel assembly for restraining an occupant in a vehicle.

FIG. 2 is a flow chart for providing a panel assembly, such as an instrument panel assembly, for restraining an occupant in a vehicle. Referring to both FIGS. 1 and 2, a method is initiated at block 202, where a system of the vehicle 102 detects a collision of the vehicle 102. The system may communicate with sensors around the vehicle 102 that sense impact force at different potential points of the vehicle 102. For example, such points of impact may include one or more of the front, rear, and/or sides of the vehicle 102.

At block 204, the system deploys one or more airbags based on the detected collision. For example, if the vehicle has a front-end collision, the system deploys at least the front airbags. The system may deploy other airbags such as side airbags depending on the particular implementation.

FIG. 3 is a schematic diagram of an example environment 100 for a panel assembly, such as an instrument panel assembly, for a vehicle, where an airbag is deployed. Shown are elements also shown in FIG. 1 including the vehicle 102 with the occupant 104, the instrument panel assembly 106, for example, having an occupant-facing surface, the detachable portion 110, and an airbag 302.

Referring still to FIG. 2, at block 206, the system causes the detachable portion 110 of the occupant-facing surface of the instrument panel assembly 106, for example, to contact the occupant 104. The contact between the detachable portion 110 and the occupant104 occurs when the detachable portion 110 is detached from the occupant-facing surface during deployment of an airbag from behind the occupant-facing surface. More specifically, after the system detects the collision of the vehicle 102, the system deploys the airbag 302. The airbag 302 inflates and comes toward the occupant 104 as an airbag typically would to protect an occupant from a secondary collision within a vehicle.

As described in more detail herein, the detachable portion 110 is adapted to contact the occupant 104 when the detachable portion 110 is detached from the occupant-facing surface during deployment of the airbag 302 from behind the occupant-facing surface. As shown, in various embodiments, the detachable portion is adapted to contact knees or lower leg portions (e.g., shins) of the occupant. This is achieved in part by the detachable portion 110 being coupled to the airbag 302. The detachable portion 110 may be coupled to the airbag 302 in any suitable manner, depending on the particular implementation. For example, in some embodiments, the detachable portion 110 may adhere to the airbag 302 with an adhesive. In some embodiments, the detachable portion 110 may be tethered to adhere to the airbag 302 with ropes or chords.

As the airbag 302 inflates, the detachable portion 110 floats on the surface of the airbag 302 toward the knees or lower leg portions of the occupant 104. As a result, the airbag 302 guides the detachable portion 110 toward knees or lower leg portions of the occupant 104 until contact is made.

In various embodiments, the airbag 302 may be shaped in a manner so as to aim the detachable portion 110 at target contact points or areas of the occupant 102 as the airbag inflates and expands toward the target contact areas. Such target contact points or areas may include the knees and/or lower portions (such as the shins) of the occupant 102), for example.

Also, in various embodiments, the detachable portion 110 may be positioned on the airbag 302 in a manner so as to aim the detachable portion 110 at the target contact areas of the occupant 102. For example, when the airbag 302 is fully deployed and expanded, the detachable portion 110 is coupled to the portion of the airbag 302 such that the detachable portion 110 is at the target contact areas of the occupant 102, and sandwiched between such target contact areas and the airbag 302.

In various embodiments, the detachable portion 110 may be positioned on the instrument panel assembly 106 at a predetermined angle when attached. The predetermined angle may be such that when the airbag 302 and the detached portion 110 are deployed, the detachable portion 110 separates from the rest of the instrument panel assembly 106 and aims at the appropriate target contact points of the occupant 102.

The detachable portion 110 is sized sufficiently large so as to make contact with the knees and/or lower-portions such as the shins of the occupant 102. The detachable portion 110 is also sized sufficiently large so as to restrain and decelerate the knees and/or lower-portions and thus the body of occupant 102. This thereby prevents the occupant 102 from traveling or submarining underneath the instrument panel assembly 106.

In various embodiments, the airbag continues to apply pressure to the contact surface (e.g., knees or lower-leg portions) of the occupant thereby causing the detachable portion 110 to in turn apply and maintain constant contact with and pressure against the knees or lower leg portions of the occupant during a collision in order to decelerate movement of the occupant. More specifically, the detachable portion 110 decelerates and restrains the knees or lower leg portions of the occupant thereby decelerating and restraining the body of the occupant 104. As indicated herein, in various embodiments, by restraining the body of the occupant 104, the detachable portion 110 when in a deployed state prevents the occupant 104 from traveling underneath or submarining the instrument panel assembly 106 during a collision of the vehicle 102.

In various embodiments, the surface area of the detachable portion 110 is greater than the surface area of a portion of the airbag 302 that applies pressure against knees or lower leg portions of the occupant 104 during a collision of vehicle 102. In other words, without the detachable portion 110, a small portion of the airbag would apply pressure against knees or lower leg portions of the occupant 104. As such, the occupant may still travel or submarine underneath the instrument panel assembly 106.

The surface area of the detachable portion 110 avoids the potential problem of the occupant 104 traveling or submarining underneath the instrument panel assembly 106. For example, the surface area of the detachable portion 110 is sufficiently large so as to stop the occupant from traveling or submarining underneath the instrument panel assembly 106. The particular size of the detachable portion 110 may vary, depending on the particular implementation. Also, the particular shape of the detachable portion 110 may vary, depending on the particular implementation.

In various embodiments, the detachable portion 110 is rigid or semi-rigid. Also, the detachable portion 110 is stiffer than the airbag after full deployment. Because the instrument panel assembly 106 is smaller in form factor comparted to conventional instrument panels, the lower portion of the airbag 302 would need to inflate larger in volume and also be inflated with more pressure in order to restrain an occupant without the detachable portion 110. In various embodiments, the detachable portion 110 enables the airbag to be smaller due to the rigidity of the detachable portion 110. This enables the airbag to be in a smaller packaging space when in a folded stored state, before deployment. Even though the instrument panel assembly 106 described herein accommodates a smaller instrument panel of an autonomous driverless vehicle, the same limited lower body displacement and deceleration is still achieved as would occur with the deployment of the larger, conventional instrument panel 108.

In various embodiments, there may be one large airbag as shown in FIG. 3. The airbag 302 may have one or more compartments or chambers, where the portion of the airbag with the lower chamber is coupled to the detachable portion 110. If the airbag 302 has two chambers, the upper chamber may have a different pressure level than that of the lower chamber. For example, the upper chamber may have less gas pressure than that of the lower chamber. As indicated herein, the upper chamber and the lower chamber may have similar or substantially the same amount of gas pressure and still be effective in restraining the body of the occupant with the aid of the detachable portion 110. In various embodiments, the upper chamber and the lower chamber may be configured such that there are no gaps between the upper and lower chambers. In some embodiments, there may be two separate airbags, an upper airbag and a lower airbag, where the lower airbag is coupled to the detachable portion 110.

Also, the detachable portion 110 enables the pressure level requirements of the airbag 302 to be relaxed or lessened due to the size and thickness of the detachable portion 110. For example, in some embodiments, if there is an upper airbag and a lower airbag, the lower airbag may be coupled to the detachable portion 110 and may have an amount of gas pressure closer to or substantially equal to that of the upper airbag. In various embodiments, the upper airbag and the lower airbag may have similar or substantially equal amounts of gas pressure, because the stiffness of the detachable portion 110, which makes contact with the target areas of the occupant 104, sufficiently compensates for the reduced gas pressure of the lower airbag.

In various embodiments, because a lower airbag may have a similar or substantially the same pressure level as an upper airbag, two airbags having differing amounts of gas pressure may be replaced by the single airbag 302 having one gas pressure and still achieve a desired deceleration and restraint of an occupant, thereby simplifying the overall instrument panel assembly, as shown in FIG. 3. The particular thickness and gas pressure of the detachable portion 110 may vary, depending on the particular implementation.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time. Also, some embodiments may not have all of the steps shown and/or may have other steps instead of, or in addition to, those shown herein.

Figure 4:
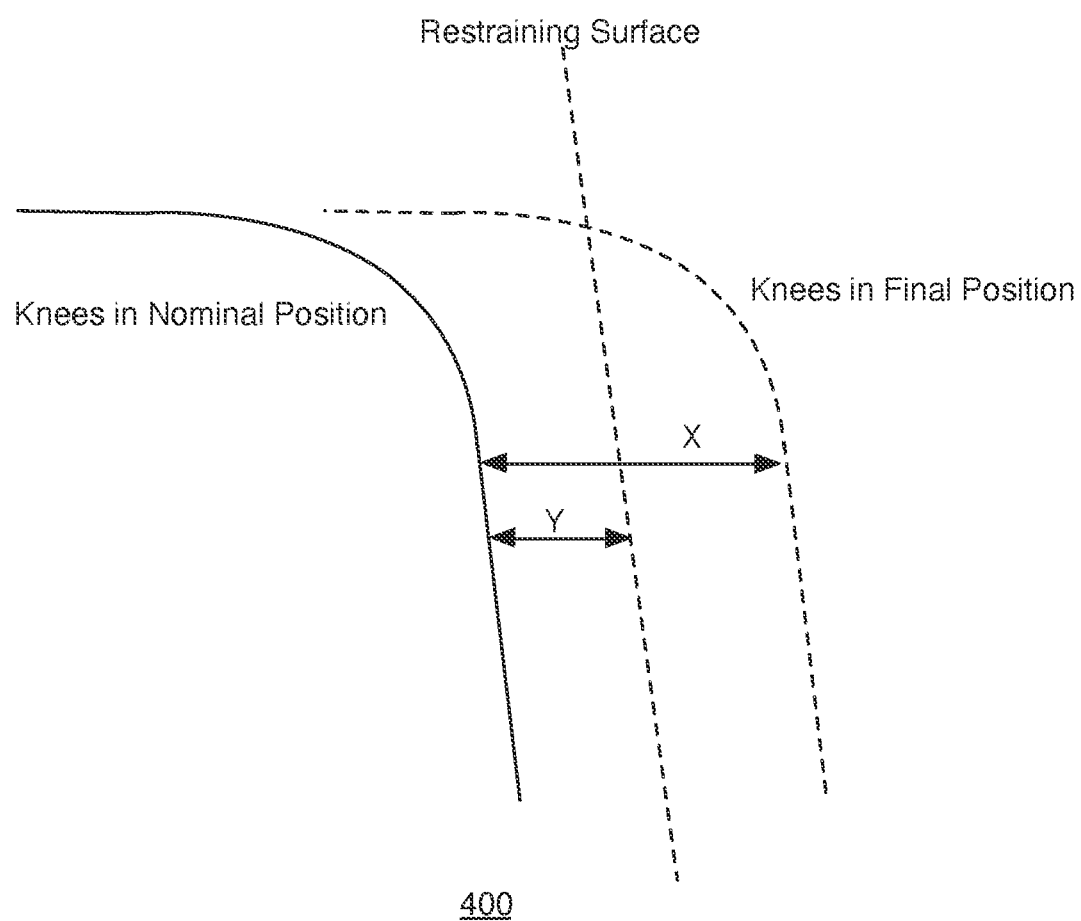
FIG. 4 is a schematic diagram showing different knee positions of an occupant during a collision of a vehicle.

FIG. 4 is a diagram showing different knee positions of an occupant during a collision of a vehicle. One purpose of a lower or knee airbag is to stop or decelerate an occupant's lower body and to achieve controlled kinematics of the occupant's upper body. The terms lower airbag and knee airbag may be used interchangeably. Referring to FIG. 4, presume that the knees of an occupant in an optimal final position during a crash sequence is X mm from the knees nominal position. Also, presume that the restraining surface in the airbag (the area of the airbag that will interact with the knees) positions itself Y mm from the knees in their nominal position. The total deceleration of the knees' distance from first contact with cushion is X-Y mm.

Decelerating the occupant's knees Y-X mm from first airbag contact is equal to locally compressing the airbag Y-X mm. The airbag may also be referred to as a knee airbag in this description. The internal nominal pressure of a knee airbag is $p_n$, and the compression of the airbag is given by applying an external pressure to the airbag from the knees/lower legs ($p_e$). The applied pressure from the knees/lower legs is given by applied force F over contact area A ($P=F/A$).

This means that if the total contact area will increase, the total applied pressure will decrease—as well as the total compression of the cushion, given that F is fixed. By this logic, the internal nominal pressure of the airbag can be lowered, if the contact area during airbag compression is increased. This results in the same deceleration distance for knees/lower legs.

The upper or passenger airbag is usually positioned/integrated on the upper part of the dashboard. The terms upper airbag and passenger airbag may be used interchangeably. During a collision, the airbag is deployed to position itself in between the occupant's upper body and the dashboard. The knee airbag module is usually positioned/integrated on the bottom part of an instrument panel. During a collision, the airbag is deployed to position itself in between the occupant's knees/lower leg portion and the dashboard. The detachable surface described herein functions as a support surface for both the occupant and the knee airbag and is a vital part for restraining the occupant.

The knee airbag is not only used for protecting an occupant's knees/lower legs, it also functions as a means for controlling the kinematics of an occupant's upper body during a collision. This is important for restraining an occupant in unbelted load cases (US legal requirement FMVSS208). The knee airbag has a higher internal nominal pressure (the pressure in the bag just before first contact with occupant) than an upper or passenger airbag.

Embodiments described herein, solve problems of a conventional knee airbag. A conventional knee airbag fill volume is ~20 L, whereas a conventional passenger airbag's fill volume is ~100-140 L. An extremely slim instrument panel drastically pushes forward the available support surfaces for both passenger and knee airbag.

The occupant should be coupled with the restraining surface (airbag) early in a crash sequence to offer a quick deceleration of an occupant. If the total fill volume of an airbag is increased, more gas is required to fill the airbag to achieve a similar internal pressure in the airbag. It could be an option to combine an upper passenger airbag and a knee airbag. However, because the knee airbag's internal pressure is higher than the upper passenger airbag cushion's, the total pressure would need to be balanced somehow. Both more fabric and a larger inflator is needed, leading to more volume to integrate in the cockpit as well as more added weight. Embodiments described herein avoid these problems.

Embodiments described herein have numerous benefits. For example, embodiments enable smaller airbags to fit into less packaging space of smaller panels or instrument panels of autonomous driverless vehicles. Embodiments also enable a single airbag instead of two different airbags having different pressure levels to achieve a desired deceleration and restraint of an occupant.

Figure 5:
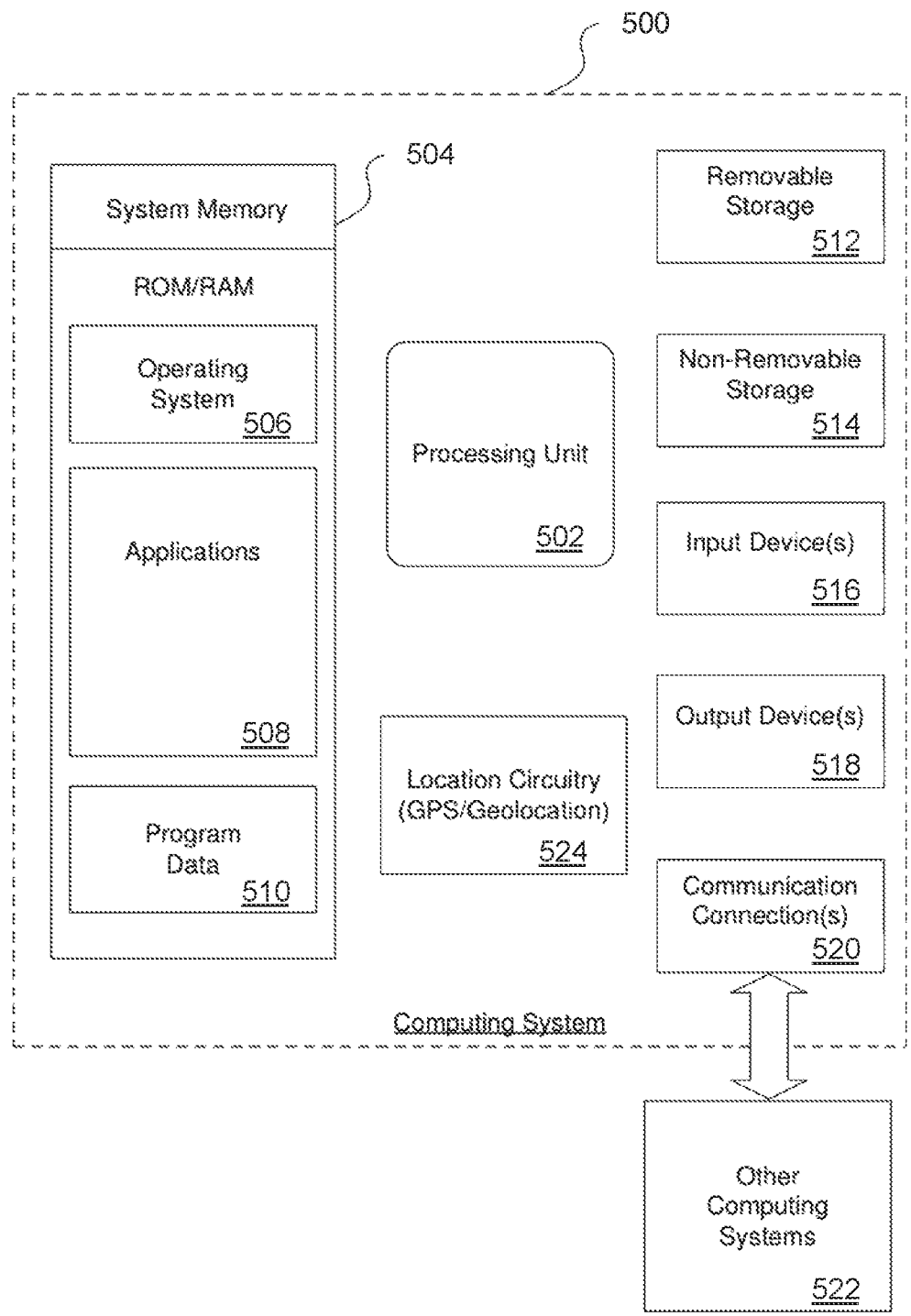
FIG. 5 is a block diagram of an example computing system of the present disclosure.

FIG. 5 is a block diagram of an example computing system 500 of the present disclosure. The computing system 500 may be used to implement the system referred to in FIGS. 1, 2, 3, and 4, as well as to perform embodiments described herein. While the computing system 500 performs embodiments described herein, in other embodiments, any suitable component or combination of components associated with the computing system 500 or any suitable processor or processors associated with the computing system 500 may facilitate performing the embodiments described herein.

The computing system 500 typically includes at least one processing unit 502 and a system memory 504. Depending on the particular configuration and type of computing device, the system memory 504 may be volatile such as random-access memory (RAM), non-volatile such as read-only memory (ROM), flash memory, and the like, or some combination of volatile memory and non-volatile memory. The system memory 504 typically maintains an operating system 506, one or more applications 508, and program data 510. The operating system 506 may include any number of operating systems executable on desktops or portable devices including, but not limited to, Linux, Microsoft Windows®, Apple OS®, or Android®.

The computing system 500 may also have additional features or functionality. For example, the computing system 500 may also include additional data storage devices (removable and/or non-removable) such as, for example, magnetic disks, optical disks, tape, or flash memory. Such additional storage may include removable storage 512 and non-removable storage 514. Computer storage media may include volatile and non-volatile, removable and non-removable media implemented in any method or technology for storage of information, such as computer-readable instructions, data structures, program modules or other data. The system memory 504, the removable storage 512, and the non-removable storage 514 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 500. Any such computer storage media may be part of the computing system 500.

The computing system 500 may also have input device(s) 516 such as a keyboard, mouse, pen, voice input device, touchscreen input device, etc. Output device(s) 518 such as a display, speakers, printer, short-range transceivers such as a Bluetooth transceiver, etc., may also be included. The computing system 500 also may include one or more communication connections 520 that allow the computing system 500 to communicate with other computing systems 522, such as over a wired or wireless network or via Bluetooth (a Bluetooth transceiver may be regarded as an input/output device and a communications connection). The one or more communication connections 520 are an example of communication media. Available forms of communication media typically carry computer-readable instructions, data structures, program modules or other data in a modulated data signal such as a carrier wave or other transport mechanism and include any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

The computing system 500 may also include location circuitry 524. In various embodiments, the location circuitry 524 may include circuitry including global positioning system (GPS) circuitry and/or geolocation circuitry. The location circuitry 524 may automatically discern its location based on relative positions to multiple GPS satellites and/or triangulation using cellular carrier network(s) and/or IEEE Standard 802.11 wireless (Wi-Fi) networks (collectively referred to as "geolocation services") to determine location based on multiple cellular communications facilities and/or multiple Wi-Fi networks. The location circuitry 524, including GPS circuitry and/or geolocation circuitry, is frequently incorporated in smartphones and many other tablets or other portable devices. In various embodiments, computing system 500 may not have all of the components shown and/or may have other elements including other types of components instead of, or in addition to, those shown herein.

Although the present disclosure is illustrated and described herein with reference to illustrative embodiments and specific examples provided, it will be readily apparent to those of ordinary skill in the art that other embodiments and examples may perform similar functions and/or achieve like results. All such equivalent embodiment and examples are within the spirit and scope of the present disclosure and are intended to be covered by the following non-limiting claims for all purposes.

What is claimed is:

1. A panel assembly for a vehicle, the panel assembly comprising:
   an occupant-facing surface; and a detachable portion of the occupant-facing surface, wherein the detachable portion is adapted to contact an occupant when the detachable portion is detached from the occupant-facing surface during deployment of an airbag from behind the occupant-facing surface, and wherein the detachable portion is rigid or semi-rigid such that a surface area of the detachable portion that contacts the occupant during the deployment of the airbag is greater than a surface area of the airbag that would otherwise contact the occupant during the deployment of the airbag without the detachable portion.

2. The panel assembly of claim 1, wherein the detachable portion is adapted to contact knees or lower leg portions of the occupant.

3. The panel assembly of claim 1, wherein the detachable portion is coupled to the airbag.

4. The panel assembly of claim 1, wherein the airbag guides the detachable portion toward knees or lower leg portions of the occupant.

5. The panel assembly of claim 1, wherein the detachable portion maintains contact with knees or lower leg portions of the occupant during a collision in order to decelerate movement of the occupant.

6. The panel assembly of claim 1, wherein the detachable portion when in a deployed state prevents the occupant from traveling underneath the panel assembly during a collision.

7. The panel assembly of claim 1, wherein the detachable portion is rigid or semi-rigid such that the surface area of the detachable portion that contacts knees or lower leg portions of the occupant during the deployment of the airbag is greater than the surface area of the airbag that would otherwise contact the knees or lower leg portions of the occupant during the deployment of the airbag without the detachable portion.

8. A panel assembly for a vehicle, the panel assembly comprising:
an occupant-facing surface;
a detachable portion of the occupant-facing surface; and
at least one airbag, wherein the detachable portion is adapted to contact an occupant when the detachable portion is detached from the occupant-facing surface during deployment of the at least one airbag from behind the occupant-facing surface, and wherein the detachable portion is rigid or semi-rigid such that a surface area of the detachable portion that contacts the occupant during the deployment of the airbag is greater than a surface area of the airbag that would otherwise contact the occupant during the deployment of the airbag without the detachable portion.

9. The panel assembly of claim 8, wherein the detachable portion is adapted to contact knees or lower leg portions of the occupant.

10. The panel assembly of claim 8, wherein the detachable portion is coupled to the airbag.

11. The panel assembly of claim 8, wherein the airbag guides the detachable portion toward knees or lower leg portions of the occupant.

12. The panel assembly of claim 8, wherein the detachable portion maintains contact with knees or lower leg portions of the occupant during a collision in order to decelerate movement of the occupant.

13. The panel assembly of claim 8, wherein the detachable portion when in a deployed state prevents the occupant from traveling underneath the panel assembly during a collision.

14. The panel assembly of claim 8, wherein the detachable portion is rigid or semi-rigid such that the surface area of the detachable portion that contacts knees or lower leg portions of the occupant during the deployment of the airbag is greater than the surface area of the airbag that would otherwise contact the knees or lower leg portions of the occupant during the deployment of the airbag without the detachable portion.

15. A computer-implemented method for restraining an occupant in a vehicle, the method comprising:
detecting a collision of the vehicle; and
causing a detachable portion of an occupant-facing surface of a panel assembly to contact the occupant when the detachable portion is detached from the occupant-facing surface during deployment of an airbag from behind the occupant-facing surface, wherein the detachable portion is rigid or semi-rigid such that a surface area of the detachable portion that contacts the occupant during the deployment of the airbag is greater than a surface area of the airbag that would otherwise contact the occupant during the deployment of the airbag without the detachable portion.

16. The method of claim 15, wherein the detachable portion is adapted to contact knees or lower leg portions of the occupant.

17. The method of claim 15, wherein the detachable portion is coupled to the airbag.

18. The method of claim 15, wherein the airbag guides the detachable portion toward knees or lower leg portions of the occupant.

19. The method of claim 15, wherein the detachable portion maintains contact with knees or lower leg portions of the occupant during a collision in order to decelerate movement of the occupant.

20. The method of claim 15, wherein the detachable portion when in a deployed state prevents the occupant from traveling underneath the panel assembly during a collision.

* * * * *